United States Patent Office 3,028,338
Patented Apr. 3, 1962

3,028,338
COMPOSITION FOR DETECTING SURFACE DISCONTINUITIES
Donald W. Parker, Jr., Park Ridge, Ill., assignor, by mesne assignments, to Switzer Brothers, Cleveland, Ohio, a corporation of Ohio
No Drawing. Filed Nov. 7, 1958, Ser. No. 772,395
15 Claims. (Cl. 252—301.2)

This invention relates to a composition for detecting surface discontinuities, and more particularly to an aqueous type, liquid penetrant for use in the non-destructive testing of solid materials for surface discontinuities, or for sub-surface flaws having surface openings. The penetrant may contain either a visible dye for imparting a contrasting color that is visible to the eye under "white" light or a fluorescent dye for imparting an enhanced contrast in color when viewed under "black" light (near ultraviolet light).

The aqueous type, liquid penetrant of my present invention has been more particularly developed for use as a non-combustible penetrant in place of the oily liquid penetrants commonly used in carrying out a method of non-destructive testing such as described in the Robert C. Switzer Patent No. 2,259,400. Penetrant inspection has found extensive use in the testing of not only metal bodies, but for inspection of non-metallic bodies as well, such, for example, as plastic, glass and porcelain articles and parts thereof.

I have now found that an aqueous type liquid penetrant has many advantages for some purposes over the oil base penetrants heretofore used. Unlike oil penetrants, aqueous type penetrants will not damage plastics. Furthermore, they present no fire hazard, since aqueous type penetrants are essentially non-combustible. Also, the water-base penetrant is non-toxic and is either non-irritating to the skin or less so than oil penetrants. Since a water-penetrant is, of course, water washable, it is adapted for use in a method that includes water washing, similar to that disclosed in the Richard A. Ward Patent No. 2,405,078. In fact, the aqueous type liquid penetrant of my present invention may be washed off the test piece more readily than the oil type penetrants heretofore used, to leave practically no residual or background color after the washing operation.

One of the difficulties heretofore experienced in the use of fluorescent oil penetrants for non-destructive testing in accordance with the water wash method of this last mentioned patent has been the difficulty in removing the penetrant from the surface of the test body without removing it from the surface discontinuities, or flaws into which the penetrant has penetrated. If, in order to avoid removal of penetrant from the flaws, slight traces of penetrant are left on the surface in the areas free from surface discontinuities, such traces, when the test piece is observed under an exciting radiation, such as ultra-violet or "black light," will give either false indications or exhibit a general, but weak emission of light, known as "background scum." This so-called "background scum" objectionably reduces the desirable contrast ratio between the fluorescent indication and the otherwise non-fluorescent background. Since my water-base penetrant may be readily washed away from the surface of the test piece, its use presents little or no problem of "background scum," or residual fluorescence.

It is therefore an important object of this invention to provide an aqueous type penetrant containing either a visible or a fluorescent dye and having the advantages above enumerated when used in the non-destructive testing of solid bodies by the penetrant method.

It is a further important object of this invention to provide a water-base, liquid penetrant that is non-combustible, non-toxic and substantially non-irritating to the skin, and that, unlike oil penetrants, will not damage or otherwise affect the surfaces of plastics when tested by the penetrant inspection method.

It is a further important object of this invention to provide an improved penetrant of an aqueous type such that the penetrant may be removed from the surface of a test body by washing with water and yet be retained in the surface flaws, if any, present in such test body.

Other and further objects of this invention will become apparent from the following description and appended claims.

In designating the composition of my present invention as a water-base penetrant, or an aqueous type penetrant, it will be understood that these terms are intended to include not only a water-containing penetrant but also a penetrant in concentrated form that is adapted to be diluted with water. In its concentrated form the composition comprises from 75 to 25% of a water soluble glycol, and from 25 to 75%, by volume, of a wetting agent. The water soluble glycol may be any glycol containing between 2 and 6 carbon atoms, inclusive, such as ethylene glycol, di-ethylene glycol, propylene glycol, or di-propylene glycol, but di-ethylene glycol has been found to be preferable.

Suitable wetting agents to be included in my penetrant are the following:

Triton X–100, supplied by Rohm & Haas, which is generically referred to as an alkyl aryl polyether alcohol, and which is specifically believed to be an iso-octyl phenyl ether of a polyethylene glycol.

Nopco 1186–A, supplied by Nopco Chemical Co., which is believed to be an anionic sulfonated alkyl ester. More specifically, it contains 70% by weight of the active sodium salt of a sulfosuccinic acid ester.

Sterox AJ, supplied by Monsanto Chemical Co., which is believed to be an 85% active non-ionic aliphatic polyoxyethylene ether.

Various visible dyes that are soluble in my water-base penetrant may be used, such as Eosin Bluish, Safranine Bluish, Alizarine Red S, Rhodamine B, Xylene Red, Red Acid Fuchsine, Rhodamine 5 GDN and Rhodamine 6 GDN. The rhodamines exhibit visible color, as well as fluorescence under black light.

Fluorescent dyes that have been found suitable for use in my composition include dyes that are soluble in oils but not in water, and dyes that are soluble in water but not in oils, preferably in admixture to give what is known as a "fluorescent cascading" effect. This phenomenon is more fully described in the copending application of Joseph L. Switzer and myself, Serial No. 535,-733, now Patent No. 2,920,203, filed September 21, 1955.

A combination of dyes found to be particularly suitable for use in a water-soluble, or water-base penetrant such as that of my present invention is a combination of uranine yellow (fluorescein sodium), 4 N-butylamino 1,8-naphthal N-butylamide, and 4-methyl-7-diethyl-amino-cumarin. These dyes dissoive in the penetrant concentrate, and also remain dispersed in the penetrant solution and do not precipitate out during dilution of the concentrate with water.

In diluting the concentrate with water for use, various proportions of water to concentrate may be used. In general from 10 to 1 parts of water to 1 part of concentrate by volume may be used in diluting the concentrate. Preferably, however, approximately three volumes of water to one of concentrate are combined in the preparation of a liquid penetrant of suitable viscosity for use in the penetrant inspection method of non-destructive testing. Less water present in the penetrant used for testing means slower washing and higher sensitivity, while a higher proportion of water present in the penetrant means quicker washing and lower sensitivity. The proportion of water to be added to the concentrate, therefore, will depend upon the properties desired in the final penetrant composition. Once these have been determined, the penetrant composition should be checked frequently with a hydrometer to maintain the water content constant at the preselected proportion.

The following is an example of a composition of penetrant concentrate embodying my invention.

*Example I*

Vehicle: Ml.
(1) Iso-octyl phenyl ether of a polyethylene glycol _____ 25
(2) Diethylene glycol _____ 25
(3) Water _____ 50

The above components are mixed and appear to dissolve mutually into each other.

Dyes: Grams per 100 ml.
(1) Uranine yellow _____ 0.15
(2) 4 N-butylamine 1, 8-naphthal N-butylamide _____ 0.15
(3) 4-methyl-7-diethyl-amino-cumarin _____ 0.15
(4) Rhodamine B _____ 0.10

The vehicle of the above example has been found to be particularly suitable, since it exhibits a high degree of penetration without regard to the nature or composition of the test body. It is equally effective in the penetrating of surface discontinuities, or flaws, in metal, glass, ceramics, or plastics, provided the flaws are clean and oil-free. It exhibits excellent washability, in that it is retained in the flaws and yet leaves on the remaining surfaces no significant residual fluorescent scums or films which would give false indications, or would diminish the contrast between the background and true indications. The evaporation of the water in the vehicle during use is objectionable only to the extent that the speed of washability may be decreased. No evidence of toxic reactions or of dermatitis has been observed among operators working with my penetrant composition containing this vehicle.

In combination with each other in the vehicle of the foregoing example, the dyes emit an extremely bright red or orange fluorescence in or around the flaws at the time of inspection. If the Rhodamine B is omitted from the dyes specified in Example I, the characteristic color is a yellow fluorescence.

If a visible penetrant is desired, visible dyes may be used in place of the fluorescent dyes of Example I, with the same vehicle. For instance, 2.5 grams per 100 ml. of any of the aforementioned visible dyes can be substituted for the four fluorescent dyes given in Example I. The resulting penetrant is used in the same manner for the detection of flaws as is described herein for the fluorescent type of penetrant except that the inspection is carried out under ordinary lighting conditions (white light).

While the composition of penetrant given in Example I is operative for the purpose described, it suffers from the disadvantage of being relatively corrosive toward metallic surfaces, particularly ferrous metals and to a lesser extent toward aluminum and magnesium, and their alloys. It is, therefore, desirable to include in the penetrant composition materials that will act as inhibitors to prevent or at least reduce the tendency of the liquid penetrant to corrode any of the metallic surfaces usually encountered in non-destructive testing.

The following is a preferred composition of penetrant concentrate containing such corrosion inhibitors.

*Example II*

| | | |
|---|---|---|
| Water | liters | 83 |
| Sodium orthovanadate | kilograms | 10 |
| Sodium nitrite | do | 3.1 |
| Diethylene glycol | liters | 212 |
| Boric acid | kilograms | 3.75 |
| Triton X-100 | liters | 106 |
| Nopco 1186-A | do | 53 |
| Sterox AJ-85% | do | 53 |
| Fluorescein P | grams | 1450 |
| 4-methyl-7-diethyl-amino-cumarin | do | 1530 |
| 4 N-butylamino-1, 8-naphthal N-butylamide | do | 1530 |
| Rhodamine B | do | 1100 |
| Potassium dichromate | do | 280 |
| Water | liters | 155 |

The combination of dyes above specified in Example II characteristically exhibits a red or orange fluorescence, but a yellow or blue-green fluorescence is obtained if rhodamine B is omitted.

Also, as in Example I, one or more visible dyes can be substituted for the fluorescent dyes of this Example II if a visible penetrant is desired. In that case, about 50,000 grams of Eosin (Bluish), or a comparable quantity of one of the other visible dyes, can be substituted in place of the fluorescent dyes given in the above formula.

The sodium orthovanadate, sodium nitrite and potassium dichromate (or other alkali metal salts corresponding thereto) constitute the corrosion inhibitors, while the boric acid, in combination with such inhibitors, acts as a buffering agent to maintain the pH of the composition at between 8 and 9, and preferably at a pH of about 8.9.

In making up the formula of Example II, the water used may be at any suitable temperature, either hot, warm or cold, and the ingredients are preferably added in the order in which named in the example. After adding the sodium nitrite, a sufficient period of time should be allowed for the sodium orthovanadate and the sodium nitrite to dissolve completely before proceeding with the further additions. Similarly, after the boric acid addition, and again after the potassium dichromate addition, time should be given for the previously added ingredients to go completely into solution.

While the aqueous type penetrant of Example II can be satisfactorily used without dilution, it would have such slow washing properties as not to be practicable for most purposes. Preferably, before use, the composition of Example II is diluted with water in the proportion of 1 part of concentrate to 3 parts of tap water. A greater dilution, up to 1 part of concentrate to 10 parts of tap water, could be made but with some sacrifice of sensitivity and with some danger that the composition would be so readily washed off the surface of the test piece as to be removed from the surface flaws as well.

In the formula of Example II, it will be noted that all three of the wetting agents are used in combination. Triton X-100 can be used alone, as in Example I, or Triton X-100 and Nopco 1186-A can be used together, without Sterox AJ, in the proportions given in Examples I or II for the wetting agent. However, a combination of all three of the wetting agents named gives preferred results.

Of the fluorescent dyes named, 4-methyl-7-diethylaminocumarin and 4 N-butylamino-1, 8-naphthal N-butylamide are soluble in oils but not in water, while uranine yellow and fluorescein P are similar to each other in that they are soluble in water but not in oils. The combination of the dyes is unique in that 4 N-butylamino-1, 8-naphthal N-butylamide and 4-methyl-7-diethyl-amino-cumarin are soluble in the water-soluble glycol, such as diethylene glycol, and also in Triton X-100, while uranine yellow is soluble in the entire vehicle of either Examples I or II but to a much greater degree in the diethylene glycol and water than the Triton X–100.

The diethylene glycol, or other water soluble glycol, is used primarily to thin out the penetrant, or impart to it a lower viscosity, since otherwise the penetrant would be much too viscous because of the extent to which Triton X–100 thickens when added to water. The water soluble glycol thus allows the penetrant to be washed off rapidly from the surfaces of the test piece. The glycol also acts as an antifreeze. As previously stated, the fluorescent dyes used in my liquid penetrant composition exhibit excellent fluorescent brilliance and color. This has been found to be due primarily to the use of Triton X–100, since without it the dyes do not exhibit the high degree of brilliance that they do in the liquid penetrant of my preferred formula.

In employing my aqueous type penetrant composition, the part to be inspected is suitably prepared, as by a degreasing operation to remove all traces of oil from the surface, and the penetrant is applied to it by coating, flooding or immersion. After sufficient time for penetration has been provided, the penetrant is washed from the surface of the test body by the scrubbing action of a spray of water, without, however, washing the penetrant out of the flaw openings. The flaw indications may then be developed, as by means of absorptive dry powders or liquid suspensions of powders, such as French talc, light magnesium carbonate and the like, all in the manner described in the above identified Ward patent. The part undergoing test is then inspected under appropriate conditions, white light in the case of the visible dyes, and fluorescigenous lighting in the case of the fluorescent dyes. The penetrant retained in the flaws and appearing at the surface openings thereof will reveal the location of the flaws by its contrasting coloration as compared with the background represented by the unflawed surface of the work, or test piece.

The present application is a continuation-in-part of the Switzer and Parker application Serial No. 535,733, now Patent No. 2,920,203, filed September 21, 1955.

It will be understood that modifications and variations in the composition of my invention may be effected without departing from the scope of the novel concepts thereof.

I claim as my invention:

1. An aqueous type concentrate for use upon dilution in detecting surface discontinuities, consisting essentially of a water soluble mixture of a water soluble glycol and a wetting agent in a proportion by volume of between 75/25 and 25/75, respectively, and a dye dissolved in said mixture in sufficient amount to give a contrasting coloration at a surface discontinuity as compared with the surrounding background surface.

2. A water-base penetrant consisting essentially of a water soluble glycol and a wetting agent in a proportion by volume of between 75/25 and 25/75, respectively, a dye in sufficient amount to give a contrasting coloration at a surface discontinuity as compared with the surrounding background surface and a sufficient quantity of water to impart to said penetrant the desired sensitivity.

3. An aqueous type concentrate for use upon dilution in detecting surface discontinuities consisting essentially of a water soluble glycol and an isooctyl phenyl ether of a polyethylene glycol in approximately equal proportions by volume, and a dye dissolved in said concentrate in sufficient amount to give a contrasting coloration at a surface discontinuity as compared with the surrounding background surface.

4. A liquid aqueous type penetrant consisting essentially of a mixture of a water soluble glycol and a wetting agent in approximately equal proportions by volume, an amount of water equal by volume to from 1 to 10 parts of water to 1 part of said mixture, and a dye dissolved therein in sufficient amount to give a contrasting coloration at a surface discontinuity as compared with the surrounding background surface.

5. The penetrant of claim 2, in which the glycol is diethylene glycol.

6. The penetrant of claim 2, in which the dye is a fluorescent dye.

7. The penetrant of claim 2, in which the dye is a visible dye.

8. The penetrant of claim 2, in which the wetting agent is an iso-octyl phenyl ether of a polyethylene glycol.

9. A water-base penetrant for detecting surface discontinuities, which consists essentially of the ingredients named hereinbelow in approximately the proportions by volume stated:

2 parts water
1 part wetting agent
1 part of an alkylene glycol containing from 2 to 6 carbon atoms, inclusive, and
A dye dissolved therein in sufficient amount to give a contrasting coloration at a surface discontinuity as compared with the surrounding background surface.

10. The water-base penetrant of claim 9, in which the dye is a fluorescent dye.

11. The water-base penetrant of claim 9, in which the wetting agent is an iso-octyl phenyl ether of a polyethylene glycol.

12. The water-base penetrant of claim 9, in which the wetting agent is a mixture of an iso-octyl phenyl ether of a polyethylene glycol, a sodium salt of a succinic acid ester and a non-ionic aliphatic polyoxyethylene ether.

13. The water-base penetrant of claim 9, in which the wetting agent is a combination of an iso-octyl phenyl ether of a polyethylene glycol and a non-ionic aliphatic polyoxyethylene ether.

14. A water-base penetrant for detecting surface flaws in solid articles, consisting essentially by volume of about 2 parts of water, 1 part of an iso-octyl phenyl ether of a polyethylene glycol, 1 part of diethylene glycol and an effective proportion of a dye dissolved therein in sufficient amount to give a contrasting coloration at a surface discontinuity as compared with the surrounding background surface.

15. The water-base penetrant of claim 14, in which the dye is a fluorescent dye.

References Cited in the file of this patent
UNITED STATES PATENTS

| | | |
|---|---|---|
| 2,292,097 | Vollmer | Aug. 4, 1942 |
| 2,478,951 | Stokely | Aug. 16, 1949 |
| 2,635,329 | De Forest | Apr. 21, 1953 |
| 2,636,127 | De Forest | Apr. 21, 1953 |

UNITED STATES PATENT OFFICE
CERTIFICATE OF CORRECTION

Patent No. 3,028,338                      April 3, 1962

Donald W. Parker, Jr.

It is hereby certified that error appears in the above numbered patent requiring correction and that the said Letters Patent should read as corrected below.

In the grant, lines 2 and 12, and in the heading to the printed specification, line 5, name of assignee, for "Switzer Brothers", each occurrence, read -- Switzer Brothers, Inc. --.

Signed and sealed this 24th day of July 1962.

(SEAL)
Attest:

ERNEST W. SWIDER
Attesting Officer

DAVID L. LADD
Commissioner of Patents